United States Patent
Fimoff et al.

(10) Patent No.: US 7,310,354 B2
(45) Date of Patent: Dec. 18, 2007

(54) SYNCHRONOUS DATA LINK SIGNAL GENERATOR

(75) Inventors: Mark Fimoff, Hoffman Estates, IL (US); Raymond C. Hauge, Fox River Grove, IL (US); Timothy G. Laud, Libertyville, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 1379 days.

(21) Appl. No.: 10/198,397

(22) Filed: Jul. 18, 2002

(65) Prior Publication Data

US 2004/0013133 A1   Jan. 22, 2004

(51) Int. Cl.
*H04J 3/00* (2006.01)
*H04J 3/02* (2006.01)

(52) U.S. Cl. .................... 370/476; 370/538
(58) Field of Classification Search ............... 370/355, 370/466, 473, 476, 522, 528, 538–539
See application file for complete search history.

(56) References Cited

U.S. PATENT DOCUMENTS

2003/0058140 A1*  3/2003  Fimoff et al. ............ 341/50

OTHER PUBLICATIONS

Harris LINKplus™ Specifications, 1 pg.
Special Report, SMPTE 310M-1998, Jan. 2000, 1 pg.

* cited by examiner

*Primary Examiner*—Kevin C. Harper

(57) ABSTRACT

A synchronous data link signal is generated for supply between digital television equipment in a studio and an RF transmitter. The synchronous data link signal includes first data to be encoded at a first data rate, second data to be encoded at a second data rate less than the first data rate, and a map defining the relative amounts and placement of the encoded first and second data in the synchronous data link signal. The first data is in the form of first output data packets of a predetermined size. The second data and the map data are multiplexed so as to provide more than one second output data packet having the predetermined size. The first and second output data packets are then multiplexed so as to provide the synchronous data link signal.

23 Claims, 2 Drawing Sheets

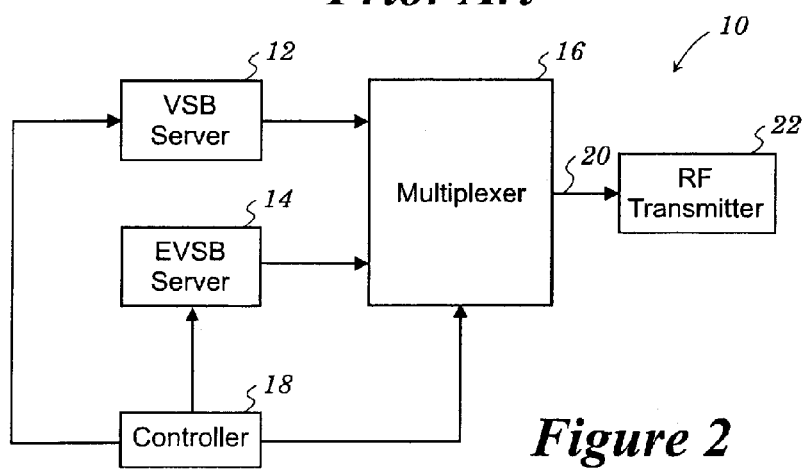
Figure 1
Prior Art
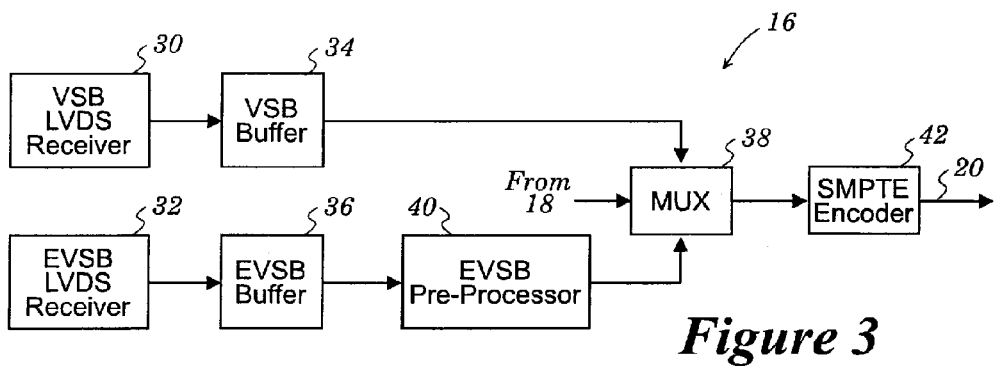
Figure 2
Figure 3

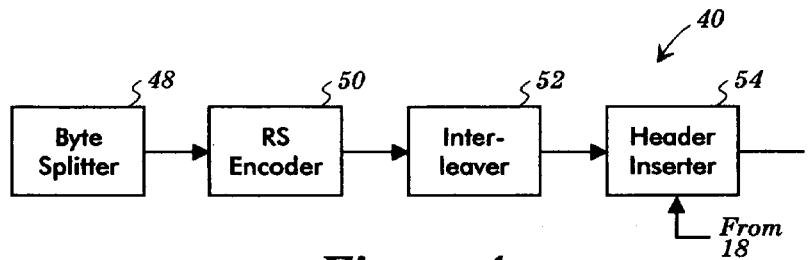
Figure 4
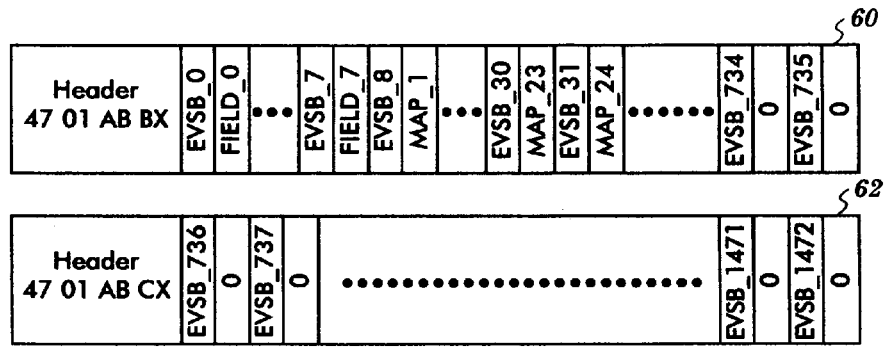
Figure 5
| 1 | EVSB MAP Message Segment |
|---|---|
| 2 | EVSB Packet |
| 3 | VSB Packet |
| 4 | VSB Packet |
| 5 | VSB Packet |
| 6 | EVSB Packet |
| 7 | VSB Packet |
| ⋮ | ⋮ |
| 311 | VSB Packet |
| 312 | VSB Packet |
Figure 6

SYNCHRONOUS DATA LINK SIGNAL GENERATOR

TECHNICAL FIELD OF THE INVENTION

The present invention relates to the generation of a synchronous data link signal. For example, this synchronous data link signal may be arranged to comply with the format specified by the SMPTE 310M standard.

BACKGROUND OF THE INVENTION

The ATSC digital television standard presently provides for the transmission of successive data transmission fields each comprising 313 segments extending over a 24.2 ms time interval. FIG. 1 discloses an exemplary format for a data transmission field according to this standard. The first segment of each transmission field is a field sync segment. The field sync segment is composed of four two-level segment sync symbols and space for 828 other two-level symbols. A portion of this space is used for a field sync, and another portion of this space is reserved. Each of the remaining segments of each transmission field comprises four two-level segment sync symbols and 828 n-level data symbols where n is currently eight, although n could be other integers such as two, four, sixteen, etc.

As indicated by U.S. patent application Ser. No. 09/804,262 filed on Mar. 13, 2001, there is presently some interest in extending the ATSC digital television standard to allow a transmission field to contain a mix of more robustly coded data (referred to herein as E-VSB data) and the data currently provided for in the standard (referred to herein as VSB data). Preferably, although not necessarily, the data mix is employed on a segment-by-segment basis such that some segments of a transmission field are used to transmit VSB data exclusively and the remaining segments of the transmission field are used to transmit E-VSB segments exclusively. However, it is possible that all data segments of a transmission field could contain either E-VSB data segments exclusively or VSB data segments exclusively. Moreover, it is also possible that the E-VSB data contained in some segments of a transmission field may be coded at one robust coding rate and that the E-VSB data in other segments of the transmission field may be coded at other robust coding rates.

As disclosed in the above mentioned '262 application, a map that indicates which segments contain the more robust (E-VSB) data and which segments contain standard VSB data is preferably provided by the transmitter to the receiver so that the receiver can properly decode and otherwise process the received VSB and E-VSB data. Assuming that a transmission field contains E-VSB data at different coding rates, the map in that case must also designate the coding rates that apply to the differently coded E-VSB data segments.

The '262 application describes one mapping system. U.S. patent application Ser. Nos. 10/011,333 and 10/011,900 filed on Dec. 3, 2001, describe another mapping system that reliably identifies which segments contain VSB data and which segments contain E-VSB data.

Moreover, SMPTE 310M is a standard that specifies a synchronous serial interface for MPEG-2 digital transport streams between studio equipment (such as multiplexer's, encoders, decoders, ATM gateways, fiber optic interfaces, etc.) and an RF transmitter. The SMPTE 310M standard defines parameters for digitally transmitting the MPEG-2 digital transport stream with a transfer rate of 19.4 or 38.8 Mbits/sec and is primarily used for digital television applications.

E-VSB data and VSB data could be transferred between studio equipment and an RF transmitter using separate lines or channels. However, when E-VSB data and VSB data are to be combined in a field along with the map data that denotes the locations of the E-VSB data and VSB data within the transmission field, it is more desirable to multiplex the data between the studio equipment and the RF transmitter over a single line or channel.

Accordingly, one embodiment of the present invention is directed to a combination of E-VSB data, VSB data, and map data so as to provide a synchronous data link signal. This synchronous data link signal can then be transmitted over a single line or channel. In one exemplary implementation of this embodiment of the present invention, this synchronous data link signal can be arranged to meet the SMPTE 310M standard.

SUMMARY OF THE INVENTION

In accordance with one aspect of the present invention, a method provides a synchronous data link signal that includes first data to be encoded at a first data rate, second data to be encoded at a second data rate less than the first data rate, and map data defining the relative amounts and placement of the encoded first and second data in the synchronous data link signal. The method comprises the following: providing the first data in the form of first output data packets of a predetermined size; multiplexing the second data and the map data to provide more than one second output data packet having the predetermined size; and, multiplexing the first and second output data packets to provide the synchronous data link signal.

In accordance with another aspect of the present invention, an electrical synchronous data link signal comprises first data packets and second data packets. Each of the first data packets has a predetermined size, and each of the second data packets has the predetermined size. Each of the first data packets contains first data to be encoded at a first data rate, each of the second data packets contains second data to be encoded at a second data rate less than the first data rate, and at least one of the second data packets includes place holding data. The first and second data packets are multiplexed in the electrical synchronous data link signal.

In accordance with still another aspect of the present invention, a method provides a synchronous data link signal including first data to be encoded at a first data rate, second data to be encoded at a second data rate less than the first data rate, and map data defining the relative amounts and placement of the first and second data in an SDL frame. The method comprises the following: providing the first data in the form of first output data packets of a predetermined size; multiplexing the second data and the map data to provide more than one second output data packet having the predetermined size; adding a header to each of the second output data packets; and, multiplexing the first and second output data packets to provide the synchronous data link signal, wherein the header uniquely identifies one of the second output data packets.

BRIEF DESCRIPTION OF THE DRAWINGS

These and other features and advantages will become more apparent from a detailed consideration of the invention when taken in conjunction with the drawings in which:

FIG. 1 illustrates an exemplary format for a data field according to the ATSC digital television standard;

FIG. 2 illustrates a VSB/E-VSB system in accordance with an embodiment of the present invention;

FIG. 3 illustrates a multiplexer that can be used in the VSB/E-VSB system shown in FIG. 2;

FIG. 4 illustrates an E-VSB preprocessor that can be used in multiplexer shown in FIG. 3;

FIG. 5 illustrates exemplary first and subsequent E-VSB segments of a field produced by the VSB/E-VSB system of FIG. 1; and, FIG. 6 illustrates an exemplary arrangement of segments contained in the synchronous data link signal provided by the multiplexer of FIG. 3.

DETAILED DESCRIPTION

A VSB/E-VSB system 10 is shown in FIG. 2 as an exemplary embodiment of the present invention. The VSB/E-VSB system 10 includes a VSB server 12 and an E-VSB server 14 coupled to a multiplexer 16. The VSB server 12 supplies VSB data to the multiplexer 16, and the E-VSB server 14 supplies E-VSB data to the multiplexer 16.

A controller 18 controls the VSB server 12 and the E-VSB server 14 in accordance with a map to supply the VSB data and the E-VSB data at the correct points in time so that the multiplexer 16 correctly formats the data for supply over a serial synchronous data link 20 to an RF transmitter 22. Thus, the controller 18 controls the multiplexer 16 in accordance with the map so that the multiplexer 16 multiplexes the VSB data and the E-VSB data in accordance with the map. Moreover, the controller 18 also supplies the map to the multiplexer 16 for inclusion in the serial synchronous data link signal that the multiplexer 16 supplies over the serial synchronous data link 20 to the RF transmitter 22. The RF transmitter 22 may include, for example, a VSB modulator, a digital filter, a VSB/E-VSB encoder, an SMPTE 310 receiver, etc.

As shown in greater detail in FIG. 3, the multiplexer 16 includes a low voltage digital signal receiver 30 that receives VSB data packets from the VSB server 12, and a low voltage digital signal receiver 32 that receives E-VSB data packets from the E-VSB server 14. The VSB data packets supplied by the VSB server 12 are typically standard 188 byte packets. The packets supplied by the E-VSB server 14 are also 188 byte packets.

The VSB data packets from the low voltage digital signal receiver 30 are buffered by a VSB packet buffer 34, and the E-VSB data packets from the low voltage digital signal receiver 32 are buffered by an E-VSB packet buffer 36. The VSB packets stored in the VSB packet buffer 34 are supplied directly to a mux 38. However, the E-VSB packets stored in the E-VSB packet buffer 36 are processed by an E-VSB preprocessor 40 as described below.

The multiplexer 16 shown in FIG. 3 assumes that E-VSB data will be provided at a single robust coding rate. If E-VSB data at other coding rates are to be included in the synchronous data link signal supplied to the RF transmitter 22, an additional low voltage signal receiver, E-VSB packet buffer, and E-VSB preprocessor may be included in the multiplexer 16 for each of such other coding rates.

As shown in FIG. 4, the E-VSB preprocessor 40 includes a byte splitter 48 that splits the E-VSB data from packets of 188 bytes to packets of 164 bytes. Accordingly, for every forty-one 188 byte packets supplied as an input to the byte splitter 48, the byte splitter 48 provides an output of forty-seven 164 byte packets. A Reed/Solomon encoder 50 of the E-VSB preprocessor 40 adds 20 Reed/Solomon bytes to each 164 bytes of data that the Reed/Solomon encoder 50 receives from the byte splitter 48. An interleaver 52 interleaves the output of the Reed/Solomon encoder 50. The interleaver 52 may be similar to the interleaver disclosed in the ATSC digital television standard and may be arranged so that B=46, M=4, and N=184. A header inserter 54 receives the interleaved Reed/Solomon encoded E-VSB data and performs a number of functions.

The header inserter 54 inserts a header from the controller 18 at the beginning of each E-VSB packet. The header includes a synchronization byte and three bytes which identify the packets as E-VSB packets. These three bytes also designate which packet is the first E-VSB packet to be inserted in an SDL frame, and which packets are subsequent packets in an SDL frame. The SDL frame is shown in FIG. 6 and is discussed below.

The header inserter 54 further inserts an odd/even field flag byte from the controller 18 after the header. The odd/even field flag designates whether the packet is to be inserted into an odd transmission field or an even transmission field, adds the map that preferably comprises three bytes and that is supplied by the controller 18, and stuffs the E-VSB data with place holder bits. These place holder bits, for example, are designated to be zero bits.

Accordingly, the first E-VSB packet is shown in FIG. 5 as a first E-VSB packet 60. The first E-VSB packet 60 includes the header described above. This header, for example, may be 32 bits. The first byte of this header comprises a synchronization byte, and the three remaining bytes of this header comprise a PID designating the packet as an E-VSB packet and further designating the packet as the first E-VSB packet to be inserted in the transmission field of FIG. 1. The remainder of the first E-VSB packet 60 includes 736 bits of E-VSB data interspersed first with the odd/even field flag byte, second with the three byte map, and third with place holder bits.

Thus, the first sixteen bits following the header comprise, in order, the first E-VSB data bit E-VSB0, the first odd/even field flag bit, the second E-VSB data bit E-VSB1, the second odd/even field flag bit, . . . , the eighth E-VSB data bit E-VSB7, and the eighth odd/even field flag bit. The odd/even field flag, for example, may be 00000000 to designate an odd field and 11111111 to designate an even field.

The next forty-eight bits contain the map and comprise, in order, the ninth E-VSB data bit E-VSB8, the first map bit, the tenth E-VSB data bit E-VSB9, the second map bit, . . . , the thirty-second E-VSB data bit E-VSB31, and the twenty-fourth map bit. The map, for example, may be twenty four bits that designate which segments in the field will contain E-VSB data and which segments in the field will contain VSB data. This arrangement implies that twenty-four bits are used for the map.

The remaining bits in the first packet contain alternating E-VSB bits and place holder bits.

A subsequent E-VSB packet to be inserted in the transmission field of FIG. 1 is shown in FIG. 5 as a subsequent E-VSB packet 62. The subsequent E-VSB packet 62 includes the header described above, except that the last three bytes designate that the subsequent E-VSB packet 62 is to be inserted in a subsequent segment of the transmission field of FIG. 1. The remaining bits in the subsequent E-VSB packet 62 contain alternating E-VSB bits and place holder bits. Each of the remaining E-VSB packets to be inserted in the field of FIG. 1 may have the construction of the subsequent E-VSB packet 62.

When ½ rate encoding is to be applied to the E-VSB data by the RF transmitter 22, two 188 byte packets are produced by the E-VSB preprocessor 40 for each 188 byte packet that is input to the E-VSB preprocessor 40. Because ½ rate encoding doubles the number of bits in the data to be encoded, the place holder bits as well as the odd/even field flag byte and the three map bytes provide places for these extra bits. The odd/even field flag byte and the three map bytes are used by the RF transmitter 22 to designate the transmission field (odd or even) and the segments in that transmission field to insert the corresponding E-VSB data and are then discarded to make room for the extra bits resulting from the ½ rate encoding.

On the other hand, when a coding rate of ¼ is to be applied to the E-VSB data by the RF transmitter 22, four 188 byte packets are produced by the E-VSB preprocessor 40 for each 188 byte packet that is input to the E-VSB preprocessor 40. Therefore, three place holder bits are required for each E-VSB bit to be encoded. Because ¼ rate encoding quadruples the number of encoded data bits, these place holder bits as well as the odd/even field flag byte and the three map bytes provide places for these extra bits. Again, the odd/even field flag byte and the three map bytes are used by the RF transmitter 22 to designate the transmission field (odd or even) and the segments in that transmission field to insert the corresponding E-VSB data and are then discarded to make room for the extra bits resulting from the ¼ rate encoding. When a coding rate of ¾ is used, one place holder bit may be used after three consecutive E-VSB bits.

As indicated above, the mux 38 of FIG. 3, operating in accordance with the map that is to be inserted into the first segment of a transmission field, multiplexes the E-VSB data packets from the E-VSB preprocessor 40 with VSB data packets from the VSB buffer 34. The mux 38 then supplies the multiplexed packets to an SMPTE encoder 42 that provides the synchronous data link signal over the serial synchronous data link 20. An SDL frame may be defined by the synchronous data link signal 20 and has the construction shown in FIG. 6. The SDL frame is provided to the RF transmitter 22 which converts the SDL frame to an odd transmission field or an even transmission field.

The first packet in the SDL frame is arranged according to the first E-VSB packet 60 of FIG. 5. Each of the remaining E-VSB packets in the SDL frame is arranged according to the subsequent E-VSB packet 62 of FIG. 5. VSB packets may be added as shown by the example of FIG. 6. The E-VSB packets and the VSB packets are interspersed through the SDL frame according to the map. (As indicated above, the SDL frame of FIG. 6 will be converted by the RF transmitter 22 to the transmission field shown in FIG. 1. As part of the conversion process, the map data will be inserted into the reserved portion of the field sync segment. Each data packet will be inserted into one or more of the data segments of an odd or even transmission field according to the odd/even field flag which will then be discarded.)

Modifications of the present invention will occur to those practicing in the art of the present invention. For example, as described above, the E-VSB packets stored in the E-VSB packet buffer 36 are first processed by an E-VSB preprocessor 40 before being supplied to the mux 38. If additional coding rates are used for E-VSB data, corresponding additional E-VSB preprocessors may be used, each operating in accordance with a particular one of coding rates.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of providing a synchronous data link signal including first data to be encoded at a first data rate, second data to be encoded at a second data rate less than the first data rate, and map data defining the relative amounts and placement of the encoded first and second data in the synchronous data link signal, the method comprising:
   providing the first data in the form of first output data packets of a predetermined size;
   multiplexing the second data and the map data to provide more than one second output data packet having the predetermined size; and,
   multiplexing the first and second output data packets to provide the synchronous data link signal.

2. The method of claim 1 wherein the synchronous data link signal defines an SDL frame, wherein the SDL frame is to be converted into a transmission field, wherein the transmission field may be odd or even, and wherein the multiplexing of the second data and the map data comprises multiplexing the second data, the map data, and an odd/even field flag having an odd state to designate that the corresponding second data is to be included in the transmission field if the transmission field is odd or an even state to designate that the corresponding second data is to be included in the transmission field if the transmission field is even.

3. The method of claim 2 wherein the multiplexing of the second data, the map data, and the odd/even field flag comprises multiplexing the second data, the map data, the odd/even field flag, and place holding data to provide the more than one second output data packet.

4. The method of claim 1 wherein the multiplexing of the second data and the map data comprises multiplexing the second data, the map data, and place holding data to provide the more than one second output data packet.

5. The method of claim 1 wherein the multiplexing of the second data and the map data comprises Reed/Solomon encoding and interleaving the second data.

6. The method of claim 5 wherein the synchronous data link signal defines an SDL frame, wherein the SDL frame is to be converted into a transmission field, wherein the transmission field may be odd or even, and wherein the multiplexing of the second data and the map data comprises multiplexing the second data, the map data, and an odd/even field flag having an odd state to designate that the corresponding second data is to be included in the transmission field if the transmission field is odd or an even state to designate that the corresponding second data is to be included in the transmission field if the transmission field is even.

7. The method of claim 6 wherein the multiplexing of the second data, the map data, and the odd/even field flag comprises multiplexing the second data, the map data, the odd/even field flag, and place holding data to provide the more than one second output data packet.

8. The method of claim 5 wherein the multiplexing of the second data and the map data comprises multiplexing the second data, the map data, and place holding data to provide the more than one second output data packet.

9. A method of providing a synchronous data link signal including first data to be encoded at a first data rate, second data to be encoded at a second data rate less than the first data rate, and map data defining the relative amounts and placement of the first and second data in an SDL frame, the method comprising:

provide the first data in the form of first output data packets of a predetermined size;

multiplexing the second data and the map data to provide more than one second output data packet having the predetermined size;

adding a header to each of the second output data packets; and, multiplexing the first and second output data packets to provide the synchronous data link signal, wherein the header uniquely identifies one of the second output data packets.

10. The method of claim 9 wherein the multiplexing of the second data and the map data comprises multiplexing the second data, the map data, and an odd/even field flag to provide the more than one second output data packet, wherein the SDL frame is to be converted into a transmission field, wherein the transmission field may be odd or even, and wherein the odd/even field flag has an odd state to designate that the corresponding second data is to be included in the transmission field if the transmission field is odd or an even state to designate that the corresponding second data is to be included in the transmission field if the transmission field is even.

11. The method of claim 10 wherein the multiplexing of the second data, the map data, and the odd/even field flag comprises multiplexing the second data, the map data, the odd/even field flag, and place holding data to provide the more than one second output data packet.

12. The method of claim 9 wherein the multiplexing of the second data and the map data comprises multiplexing the second data, the map data, and place holding data to provide the more than one second output data packet.

13. The method of claim 9 wherein the multiplexing of the second data and the map data comprises Reed/Solomon encoding and interleaving the second data.

14. The method of claim 13 wherein the multiplexing of the second data and the map data comprises multiplexing the second data, the map data, and an odd/even field flag to provide the more than one second output data packet, wherein the SDL frame is to be converted into a transmission field, wherein the transmission field may be odd or even, and wherein the odd/even field flag has an odd state to designate that the corresponding second data is to be included in the transmission field if the transmission field is odd or an even state to designate that the corresponding second data is to be included in the transmission field if the transmission field is even.

15. The method of claim 14 wherein the multiplexing of the second data, the map data, and the odd/even field flag comprises multiplexing the second data, the map data, the odd/even field flag, and place holding data to provide the more than one second output data packet.

16. The method of claim 13 wherein the multiplexing of the second data and the map data comprises multiplexing the second data, the map data, and place holding data to provide the more than one second output data packet.

17. A method of providing a synchronous data link signal including first packets of first data to be encoded at a first data rate, second packets of second data to be encoded at a second data rate less than the first data rate, and map data defining the relative amounts and placement of the encoded first and second data in the synchronous data link signal, wherein each of the first packets has a first size, wherein each of the second packets has a second size, wherein the first and second sizes are equal, the method comprising:

splitting the second packets into packet portions each having a third size, wherein the third size is less than the second size;

adding data to the packet portions to create third packets, wherein each of the third packets has a size, wherein the size of each of the third packets is equal to the second size, and wherein the data added to the packet portions includes header data; and, multiplexing the first packets, the third packets, and the map data to provide the synchronous data link signal.

18. The method of claim 17 wherein the synchronous data link signal defines an SDL frame, wherein the SDL frame is to be converted into a transmission field, wherein the transmission field may be odd or even, and wherein the multiplexing comprises multiplexing the third data packets, the map data, and an odd/even field flag having an odd state to designate that the corresponding third packets are to be included in the transmission field if the transmission field is odd or an even state to designate that the corresponding third packets are is to be included in the transmission field if the transmission field is even.

19. The method of claim 18 wherein the multiplexing comprises multiplexing the third data packets, the map data, and place holding data to provide the synchronous data link signal.

20. The method of claim 17 wherein the multiplexing comprises multiplexing the third data packets, the map data, and place holding data to provide the synchronous data link signal.

21. The method of claim 17 wherein the data added to the packet portions further includes Reed/Solomon data.

22. The method of claim 17 wherein the multiplexing comprises multiplexing the first packets, the third packets, and the map data as an SDL frame, and wherein the method further comprises converting the SDL frame to an ATSC digital television standard transmission field.

23. The method of claim 22 wherein the ATSC digital television standard transmission field may be odd or even, and wherein the multiplexing of the first packets, the third packets, and the map data as an SDL frame comprises multiplexing the first packets, the third packets, the map data, and an odd/even field flag having an odd state to designate that the corresponding third packets are to be included in the ATSC digital television standard transmission field if the ATSC digital television standard transmission field is odd or an even state to designate that the corresponding third packets are to be included in the ATSC digital television standard transmission field if the ATSC digital television standard transmission field is even.

* * * * *